July 12, 1932.  P. J. TAFT  1,867,337
BICYCLE GEAR SHIFT
Filed Feb. 4, 1931  2 Sheets-Sheet 1
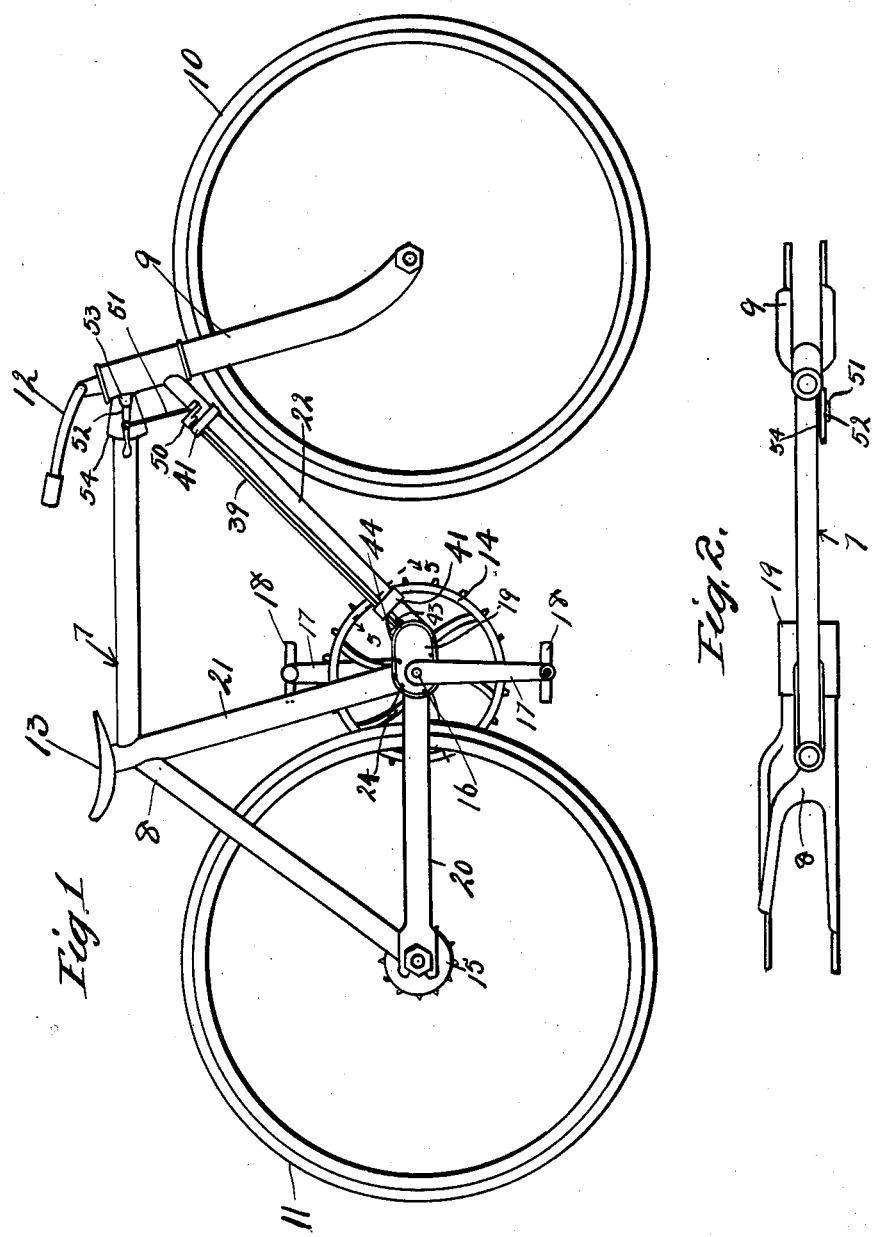
Inventor
Peter J. Taft
By W. W. Williamson
Atty.

July 12, 1932.  P. J. TAFT  1,867,337
BICYCLE GEAR SHIFT
Filed Feb. 4, 1931  2 Sheets-Sheet 2
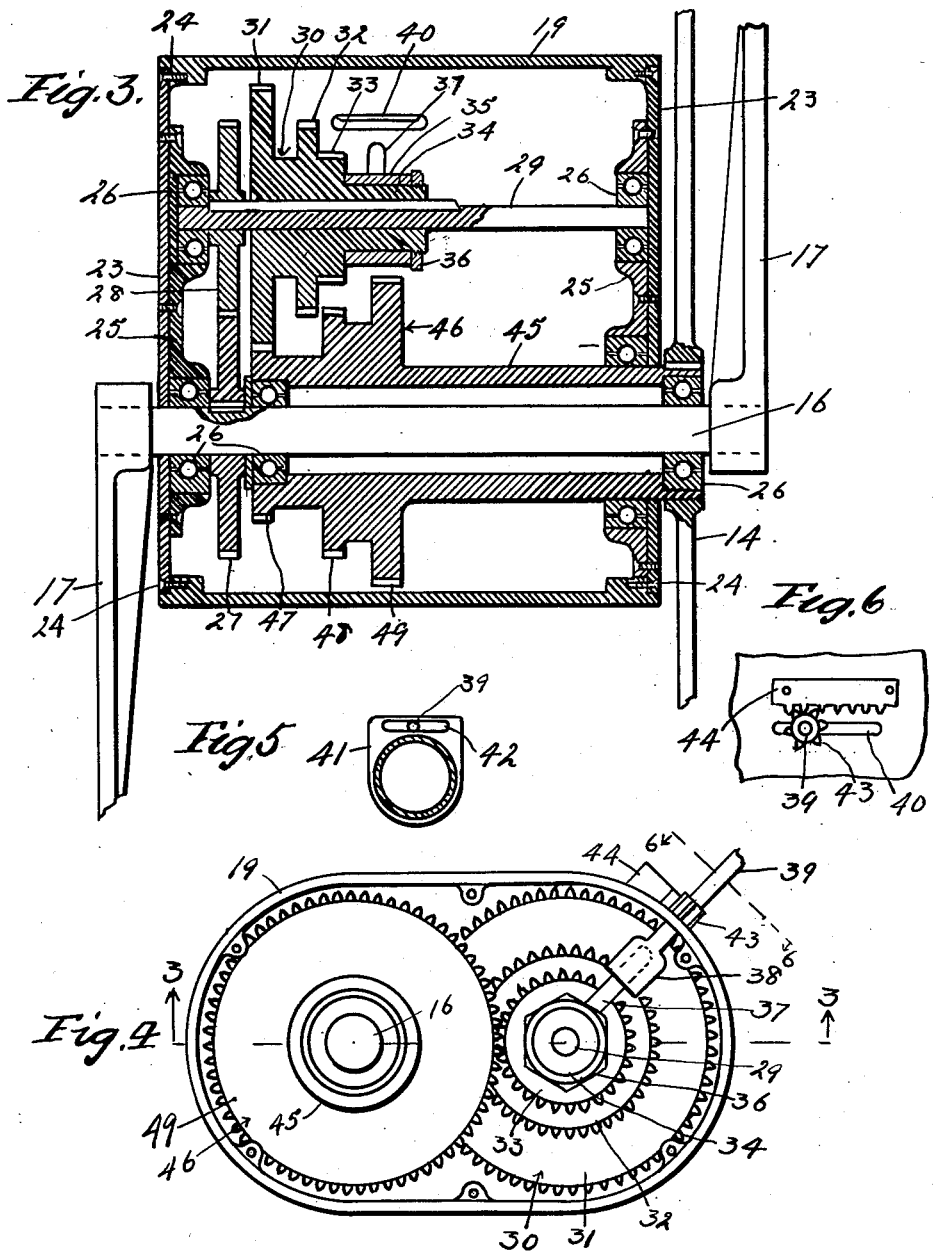
Inventor
Peter J. Taft
By H. W. Williamson Patented July 12, 1932

1,867,337

UNITED STATES PATENT OFFICE

PETER J. TAFT, OF PHILADELPHIA, PENNSYLVANIA

BICYCLE GEAR SHIFT

Application filed February 4, 1931. Serial No. 513,275.

My invention relates to new and useful improvements in a bicycle gear shift and has for one of its objects to generally improve devices of this kind and whereby the power transmission ratio may be readily and quickly changed by the bicycle rider.

Another object of the invention is to provide a casing for the change speed gearing which is built into or as a part of the bicycle frame.

A further object of the invention is to provide a unique arrangement of gears for changing from one speed to another, said gears preferably being so arranged that there is a low speed, an intermediate speed and a high speed.

A still further object of the invention is to so construct the gear shift parts that the driven shaft is concentric with and surrounds the driving shaft with the motion being transmitted from the driving shaft through a train of gearing to an intermediate shaft and then through a train of gearing to the driven shaft, the latter carrying a sprocket so that motion may be transmitted from the driven shaft through a chain and another sprocket to the axle of one of the wheels of the bicycle.

Another object of the invention is to provide mechanism for shifting one set of gearing, which mechanism includes operating means which can be positioned within easy access of the rider, preferably adjacent the handle bars.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a conventional showing of a bicycle in side elevation.

Fig. 2 is a top plan view of the frame per se.

Fig. 3 is an enlarged horizontal sectional view of the gear shift structure on the line 3—3 of Fig. 4.

Fig. 4 is an end view of Fig. 3 with the end wall, cranks and sprocket wheel removed.

Fig. 5 is an enlarged sectional view on the line 5—5 of Fig. 1 to illustrate only the construction of one of the brackets.

Fig. 6 is a section on the line 6—6 of Fig. 4.

In carrying out my invention as herein embodied, 7 represents a bicycle including a frame 8, the front fork 9, front and rear supporting wheels 10 and 11 respectively, handle bars 12, a seat 13, a driving sprocket 14, a driven sprocket 15 over which sprockets run the usual chain, not shown, a crank shaft 16 and cranks 17 carrying the pedals 18.

The reference numeral 19 designates a casing carried by the bicycle frame and preferably formed as an integral part thereof and also preferably located at the usual point of union between the lower rear fork 20, the upright 21 and the reach 22. In actual practice during the manufacture of the bicycle frame, the parts 20, 21 and 22 are brazed or otherwise secured to the casing 19.

The casing is open at both ends or sides but normally closed by the end caps 23 which are removably held in place by fastening devices 24, such as screws, passing through the end caps and threaded into lugs or projections formed on the inside of the casing and acting as seats for the end caps. The end caps carry on their inner surfaces suitable bearing parts 25 for the reception of suitable anti-friction bearings 26 for the different shafts to be presently described.

The crank shaft 16 passes completely through the casing so that ends thereof project beyond the end caps and on the projecting ends are mounted the cranks or hangers 17. On the crank shaft 16 within the casing is fixed a gear 27 meshing with identically the same kind of gear 28 fixed on the shaft 29 located entirely within the casing so as to revolve at the same ratio of speed as the crank shaft 16 but in a reverse direction.

On the shaft 29 is splined a multiple gear structure 30 so as to slide longitudinally of said shaft 29 and yet revolve therewith and said multiple gear structure may be made up of a plurality of gears or the entire structure may be made as one complete integral unit. Said multiple gear structure includes or consists of a large gear 31, an intermediate gear 32, a small gear 33 and a trunnion 34. On the trunnion is mounted a sleeve 35 positioned between a face of the smaller gear 33 and a nut 36, or equivalent thereof, threaded or otherwise mounted on the end of the trunnion. The sleeve carries a post 37 adapted to project into a socket 38 at the inner end of the operating shaft 39, which shaft projects through a slot 40 in the casing 19 and runs along the reach 22, as plainly shown in Fig. 1.

The operating shaft is held in place and prevented from undue rattling by suitable brackets 41 which are mounted on the reach 22 and have slots 42 through which the operating shaft 39 projects and may move from side to side. On said operating shaft 39 is a gear 43 meshing with a rack 44 carried by the casing and preferaby on the outside thereof so that when the operating shaft is revolved, the gear will "walk" along the rack, thereby shifting the operating shaft from one side to the other for moving the multiple gear structure along the shaft 29 for changing the power transmission or speed ratio as will be more fully understood from the following description.

A hollow or cylindrical shaft 45 surrounds the crank shaft 16 and one end projects through one of the end caps of the casing on which the sprocket wheel 14 is mounted and said hollow or cylindrical shaft 45 carries a multiple gear structure 46 similar to the multiple gear structure 30 but with the gears in reverse positions. This multiple gear structure 46 may be produced from separate gears or said gears may be formed integral and connected with the cylindrical or hollow shaft or said multiple gear structure may be formed as an integral part of said hollow or cylindrical shaft.

The multiple gear structure 46 includes a small gear 47, an intermediate gear 48 and a large gear 49. The gears in both of the multiple gear structures are so arranged relative to each other and to the gears of the companion multiple gear structure that when a large gear 31 is in mesh with the small gear 47, none of the other gears of the two multiple gear structures are in engagement or operative condition and therefore motion and power will be transmitted only through the large gear 31 from the shaft 29, thence through the small gear 47 to the hollow or cylindrical shaft 45 and therefore the cylindrical shaft and the sprocket 14 carried thereby will be revolved at greater speed than the crank shaft 16, thus giving a high speed transmission of power from the driving means to the driven means. Upon rotating the opearting shaft 39 in the proper direction, the multiple gear structure 30 will be moved longitudinally along the shaft 29 until the gear 32 meshes with the gear 48 at which time the other gears of the multiple gear structure will be out of engagement and a second or intermediate speed transmission will take place. By further revolving the operating shaft 39, the multiple gear structure will be moved along the shaft 29 until the small gear 33 meshes with the large gear 49 at which time the other gears will be out of engagement and then a low speed ratio of power transmission will take place between the driving and driven means. Of course it will be understood that by rotating or revolving the operating shaft 39 in the opposite direction, the different gears will be brought into engagement with each other in the reverse sequence. It might be well to state at this time that when the intermediate gears are in mesh, the operating shaft 39 may rotate in either direction according to whether a high or low speed is desired.

While the operating shaft 39 may be rotated in any suitable or desirable manner or by means applicable thereto, I have illustrated a simple structure or means for accomplishing this which consists of a crank 50 mounted on the upper or outer end of the operating shaft and to which is connected one end of a pitman or connecting rod 51 while the opposite end is connected to a hand lever 52 pivoted at one end, as indicated at 53 to a quadrant 54 or equivalent by which the hand lever may be set and held in any adjusted position according to the speed transmission desired.

The hand lever and associated parts may be located at any suitable position on the bicycle frame but preferably on the cross bar adjacent the handle bars whereby said levers will be within easy access of the bicycle rider to permit changing of the ratio speed transmission at any time during operation of the bicycle.

Of course I do not wish to be limited to the exact details of construction as herein shown, as these may be varied within the limits of the appended claims without departing from the spirit of my invention.

Having thus fully described my invention, what I claim as new and useful is:—

1. In a device of the kind described, a casing formed as a part of the bicycle frame open at both ends, end caps to close the open ends, bearing elements carried by said end caps, a crank shaft passing through the casing with both ends projecting beyond the end caps, a jack shaft entirely within the casing and paralleling the crank shaft, a train of gears for transmitting motion from the crank shaft to the jack shaft, a hollow shaft surrounding the crank shaft and having one end projecting outside of the casing, a sprocket wheel on the projecting end of said hollow shaft, a multiple gear structure comprising a small, an intermediate and a large gear carried by the hollow shaft, a second multiple gear structure mounted to revolve with and slide on the jack shaft and including a large gear, an intermediate gear and a small gear in reverse sequence to the gears of the first mentioned multiple gear structure and also including a trunnion, a sleeve mounted on said trunnion which is prevented from endwise movement in one direction by the contiguous gear, means removably mounted on the trunnion to prevent endwise movement of the sleeve in the opposite direction, a post carried by said sleeve, a rack fixed on the outside of the casing adjacent a slot in said casing, an operating shaft projected through the slot, a socket on the inner end of said operating shaft for registration with the post, a gear mounted on said operating shaft and meshing with the rack to walk along the same when the operating shaft is rotated whereby the sliding multiple gear structure will be moved along the jack shaft for selectively bringing the gears on the sliding multiple gear structure into mesh with the gears of the other multiple gear structure, and means to revolve the operating shaft.

2. In a device of the kind described, a casing, a number of shafts therein, trains of gearing for transmitting motion from one to another and from said other in different ratios to still another, a portion of one of the gear trains being movable, an operating shaft connected with the movable portion and capable of rotation thereon, a gear carried by said operating shaft, and a fixed rack with which said gear meshes and along which it walks when the operating shaft is rotated whereby the movable portion will be actuated.

3. In a bicycle gear shift, a crank shaft, a hollow shaft surrounding a portion of the crank shaft, a sprocket mounted on said hollow shaft, a jack shaft, a train of gears for transmitting motion from the crank shaft to the jack shaft, a multiple gear structure carried by the hollow shaft and including a plurality of different sized gears, another multiple gear structure mounted on the jack shaft to revolve therewith and slide thereon, said last named multiple gear structure including a plurality of different sized gears for selective engagement with companion gears on the first mentioned multiple gear structure, a sleeve mounted on the sliding gear structure, a post projecting from said gear, an operating shaft mounted for rotation and sidewise swinging movement, a socket carried by said operating shaft for registration with the post, a gear on said operating shaft, a stationary rack with which the gear on the operating shaft meshes and over which it walks for moving the sliding multiple gear structure when the operating shaft is rotated, a crank on said operating shaft, a hand lever pivoted at one end, and a connecting rod connected with the crank and the hand lever whereby motion may be transmitted from the lever to the operating shaft.

In testimony whereof, I have hereunto affixed my signature.

PETER J. TAFT.